UNITED STATES PATENT OFFICE.

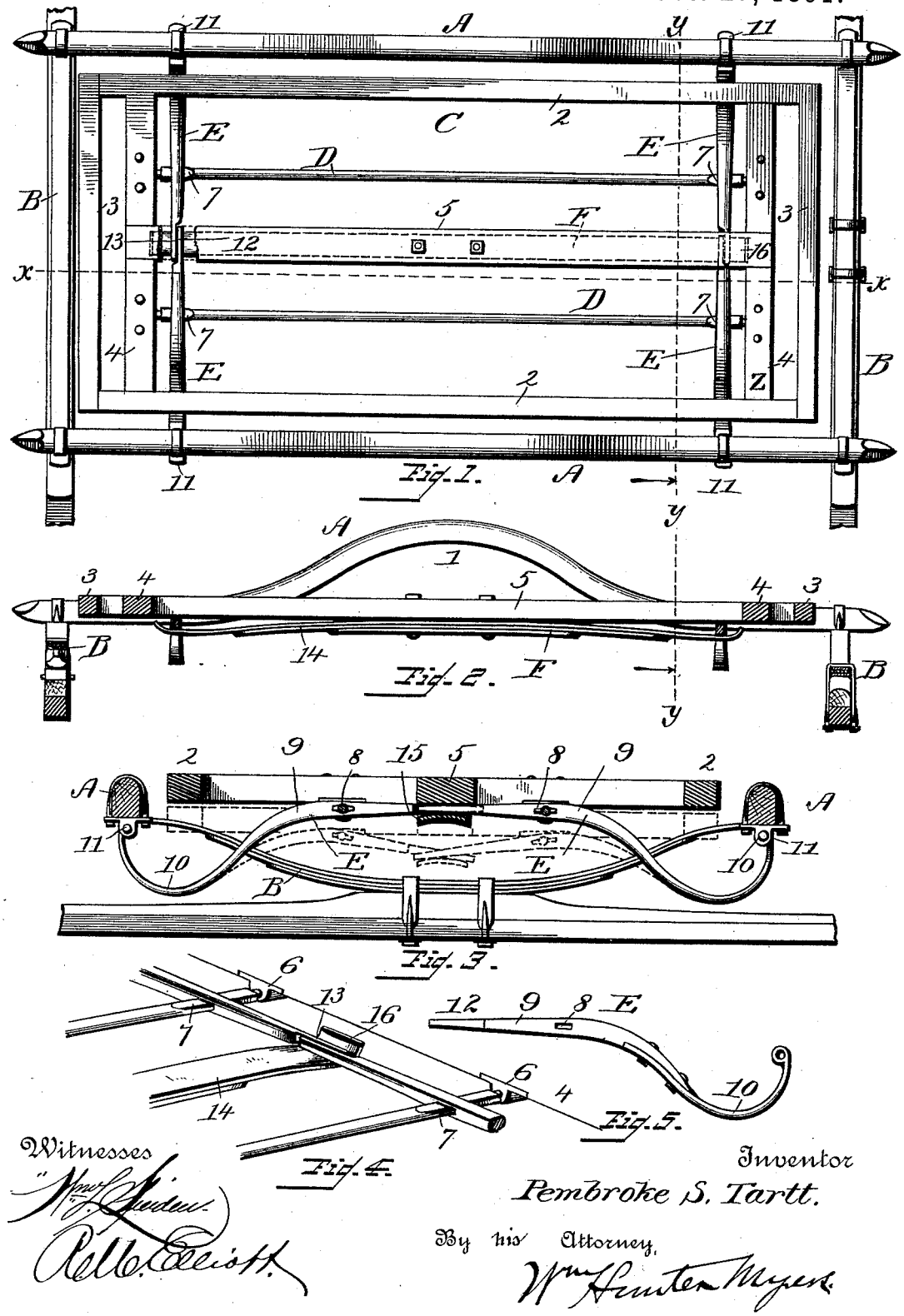

PEMBROKE S. TARTT, OF WINGO, KENTUCKY.

SIDE-BAR VEHICLE.

SPECIFICATION forming part of Letters Patent No. 462,070, dated October 27, 1891.

Application filed July 25, 1891. Serial No. 400,667. (No model.)

*To all whom it may concern:*

Be it known that I, PEMBROKE S. TARTT, a citizen of the United States of America, residing at Wingo, in the county of Graves and State of Kentucky, have invented certain new and useful Improvements in Vehicles, of which the following is a specification, reference being had therein to the accompanying drawings.

This invention relates to an improvement in vehicles, and more particularly to side-bar buggies and carriages.

The objects of the invention are, first, to provide a vehicle having its body-bed so supported that it will at all times occupy a horizontal plane with relation to the axle-trees, whether the weight occupies a position either centrally or at one side of the body; secondly, to provide means for distributing the weight carried by the body, so as to cause the latter to occupy a horizontal plane from end to end, or, in other words, to cause the end of the body which is free from weight to occupy the same plane as the end on which the weight is located; thirdly, to provide for a long and undulatory vibration of the body, as opposed to the quick and springy movement common to most vehicles, whereby to lessen the jar communicated to the body incident to the contact of the wheels with obstructions in the passage of the vehicle over a road; fourthly, to provide for a lateral vibratory movement, as well a vertical movement, whereby to cause the body to adjust itself automatically to any inequalities in the grade of the road, so as to permit it to occupy a plane parallel with the axle-trees in going either up or down a hill; fifthly, to provide side bars of such construction as while permitting the vehicle to make a short turn they offer no obstruction to a person entering or leaving the vehicle; sixthly, to provide a vehicle in which but a single body-spring is employed, as opposed to the usual side-bar buggy, in which two or more springs are used, and, finally, to provide a vehicle which will combine with the features enumerated high efficiency and durability in use, simplicity of construction, and cheapness of manufacture.

With these objects in view the invention consists in the novel construction and combination of parts of a vehicle, as will be hereinafter fully described and claimed.

In the accompanying drawings, forming part of this specification, and in which like letters and numerals of reference indicate corresponding parts, Figure 1 is a top plan view of a vehicle, the running-gear and the body being removed, showing the relative positions occupied by the supporting-frame, the fulcrum-levers, spring-levers, and the body-bed. Fig. 2 is a longitudinal vertical sectional view taken on the line $x\ x$ of Fig. 1, showing more particularly the construction of the side bars. Fig. 3 is a transverse sectional view taken on the line $y\ y$ of Fig. 1, showing more clearly the connection between the side bars and the spring-levers. Fig. 4 is a detail perspective view showing a portion of the body-spring and the spring-levers in engagement therewith. Fig. 5 is a view of a modified form of spring-lever.

Referring to the drawings, A designates the side bars, the ends of which are in this instance shown connected by half-springs B; but, if desired, rigid end bars may be substituted for the springs and will be found to answer the requirements in many cases. The side bars are curved upward at or near their centers, as at 1, so as to permit the front wheels to cut under close to the bed, thus admitting of the vehicle being turned in a more contracted space than with vehicles employing straight side bars. The side bars and their end connections form what is termed in this instance a "supporting-frame," by which name it will be designated throughout the specification and the claims.

C designates the body-bed, consisting of two side rails 2, end pieces 3, supplemental end pieces 4, and a center rail 5, which parts are firmly secured together in a manner best calculated to withstand the strain and wrenching to which a body-bed is necessarily subjected.

D designates two fulcrum-rods, the ends of which are each journaled in suitable boxes 6, Fig. 4, carried by the supplemental end pieces 4. At a point near both ends of each of the rods the metal is flattened, as at 7, which flattened portions are designed to engage mortises 8, formed in the spring-levers E, whereby to secure the latter firmly in place. These levers, which are by preference four in number, are each constructed of a rigid portion 9 and a tapered curved spring portion 10, which latter portion in each of the levers is pivotally secured in clips 11, carried by the side bars. If desired, these levers may be made of two pieces of metal firmly bolted together, as shown in Fig. 5. The inner ends of each of the rigid portions 9 are reduced, as at 12, so that when two of the levers are in their normal positions a lap-joint 13 is formed, which serves to keep the two ends in their proper position with relation to each other.

F designates the body-spring, which is firmly bolted to the under side of the center rail 5. This spring is constructed of a series of leaves, preferably straight, the longest of which 14 bears against the said rail, its ends being made convex on the upper side, as at 15, Fig. 3, thus forming rock-bearings for the inner ends of the levers E, and at each end of the spring there is an upturned flange 16, Fig. 4, for preventing the ends of the levers slipping off the spring when the body-bed is vertically vibrated.

The different parts of the invention having been fully described, the manner of its operation will now be explained. We will suppose that a person occupies a position in the vehicle directly over that part marked Z in Fig. 1. In vehicles as ordinarily constructed that corner would be depressed, leaving the other portions of the body in nearly their normal positions, the same being substantially true should a person of less weight be seated on the opposite side. By my improvement, however, the weight of the occupant will tend to depress all portions of the body-bed alike, this being due to the fact that as the levers are rigidly fulcrumed on the longitudinal rods the latter cannot be depressed without rocking the inner ends of the former against the stress of the body-spring, the outer ends of the levers being pivotally attached to clips on the side bars. It will also be observed that while the body-bed is capable of a lateral movement by reason of the elastic portion of the levers it is prevented from backward and forward movements by the levers. The spring portion of the levers performs another important function in addition to that already described—namely, that of breaking the force of the jar to the occupant of the vehicle when the wheels contact with any obstruction, inasmuch as the impact is communicated first to the side bars, then to the spring-levers, and finally to the body-spring, which, on account of its length, vibrates but slowly, so that what would with an ordinary vehicle be a violent jar will in this case prove a gentle and undulatory movement.

Having thus fully described my invention, what I claim as new, and desire to secure by Letters Patent, is—

1. In a vehicle, the combination, with a supporting-frame, of a body-bed, a spring arranged longitudinally of said bed, and a series of levers arranged transversely of the body-bed, the inner ends of said levers being in engagement with the spring and the outer ends pivotally connected to the supporting-frame.

2. In a side-bar vehicle, the combination, with the side bars, of a body-bed, longitudinal fulcrum-rods journaled therein, a central longitudinal spring secured to the under side of said bed, and a series of levers fulcrumed on said rods and pivotally attached at one end to the side bars, their free ends being in engagement with the ends of the spring.

3. In a side-bar vehicle, the combination, with the side bars, of a body-bed, longitudinal fulcrum-rods journaled therein, a central longitudinal spring secured to the under side of the bed, the ends of said spring being formed convex and flanged, as described, and a series of spring-levers rigidly fulcrumed on said rods and pivotally attached to the side bars, their free ends being in engagement with the ends of the spring.

In testimony whereof I affix my signature in presence of two witnesses.

PEMBROKE S. TARTT.

Witnesses:
J. M. BAKER,
J. M. TARTT.